UNITED STATES PATENT OFFICE.

ALEXANDER K. MURRAY, OF BRADFORD, PENNSYLVANIA.

FUEL COMPOSITION.

SPECIFICATION forming part of Letters Patent No. 419,867, dated January 21, 1890.

Application filed March 20, 1889. Serial No. 304,024. (No specimens.)

*To all whom it may concern:*

Be it known that I, ALEXANDER K. MURRAY, a citizen of the United States, residing at Bradford, in the county of McKean and State of Pennsylvania, have invented certain new and useful Improvements in Fuel Compositions; and I do declare the following to be a full, clear, and exact description of the invention, such as will enable others skilled in the art to which it appertains to make and use the same.

This invention has relation to fuel compositions; and it consists in the combination of lignite with other materials and substances, substantially as hereinafter specified, and particularly pointed out in the subjoined claim.

The object of my invention is to provide a fuel compound which will be extremely susceptible to combustion, will burn for the greatest length of time and throw off sufficient heat for all purposes, and which at the same time can be put upon the market for a mere nominal cost by reason of the fact that it contains nothing but products which would otherwise be permitted to go to waste, the principal ingredient (lignite) being very plentiful in certain of the Western States, notably in the Dakotas, Nebraska, and Kansas, and no available means being now known for utilizing it practically for fuel.

Lignite crumbled (which condition it assumes upon being exposed to the air for a short length of time, as is well known) forms the base of my improved fuel composition, and with it is compounded a mixture consisting of the dust of bituminous coal, slack or culm, and clay or adobe, mixed with water.

In carrying out my invention I take a quantity of lignite—say seven parts—in the condition it assumes upon exposure to the atmosphere (the change which takes place upon such exposure being somewhat similar to the slaking of lime) and place it in a suitable receptacle. I next make a mixture in quantity about equal to one part, or one-seventh of the quantity of lignite, such mixture consisting of about ninety per cent. of the dust of bituminous coal, slack or culm, and ten per cent. of clay, (blue clay or adobe preferred,) and a sufficient quantity of water to bring this mixture to such a consistency as will, when mixed with the lignite, bring the whole mass to the consistency of stiff putty. I now add this mixture to the lignite and thoroughly mix the mass by stirring or other suitable operation, after which I press the mass into suitable blocks in molds, between plates, or in any other suitable and well-known manner.

The coal-dust I prefer is that of the very poorest quality for use as fuel by itself by reason of the presence therein of an excess of sulphur and tar, as I have found by experiment that this quality produces the best results in my mixture. This quality is of course the cheapest, and its use in carrying out my invention amounts substantially to the utilization of so much waste material. The lignite is also substantially a waste material, no practical method for its utilization being now known or in public use, so far as I am aware. In view of the fact that all the ingredients of my new fuel composition are plentiful in localities where there is a great scarcity of fuel, the importance of my invention will be at once manifest.

I have found by thorough experiment that my fuel is for all practical purposes equal to anthracite coal, burning with intense heat, and being almost entirely reduced to ashes, with practically no solid residue and an entire absence of clinkers.

In the use of the adobe (my preferred substance for the purpose, both on account of its qualities and the plentiful and cheap supply to be had in the regions named) I also utilize another substantially waste material.

The lignite and coal-dust I consider essential elements or ingredients in my composition, as I do also some material for hardening and rendering the mass of a proper consistency.

I do not wish to be understood as limiting myself to the exact proportions named, as a slight departure may be made therefrom without departing from the spirit of my invention.

Having now described my invention, what I believe to be new and desire to secure by

Letters Patent, and what I therefore claim, is—

A fuel composition consisting of lignite, about seven parts, bituminous-coal dust, about one part, and sufficient of a mixture of clay and water to bring the whole mass to the consistency of soft putty.

In testimony whereof I affix my signature in the presence of two witnesses.

ALEXANDER K. MURRAY.

Witnesses:
 GEO. A. BERRY,
 T. J. MELONE.